E. R. EVANS.
DIFFERENTIAL MECHANISM.
APPLICATION FILED NOV. 15, 1917.
1,317,281.
Patented Sept. 30, 1919.
6 SHEETS—SHEET 2.
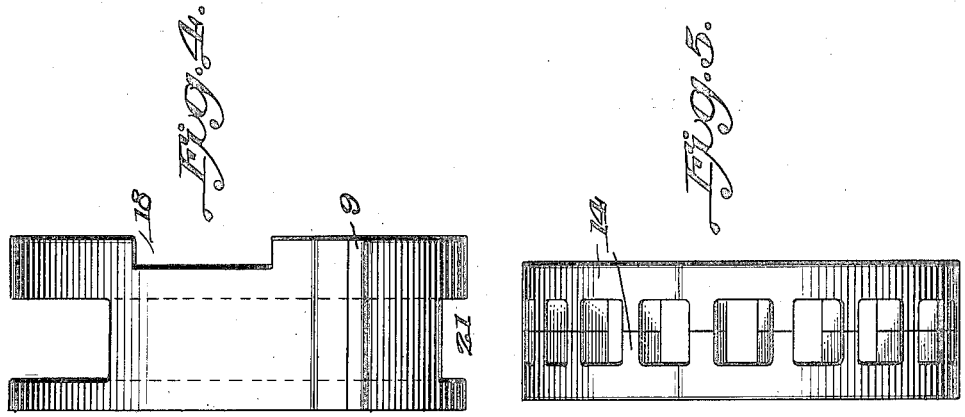
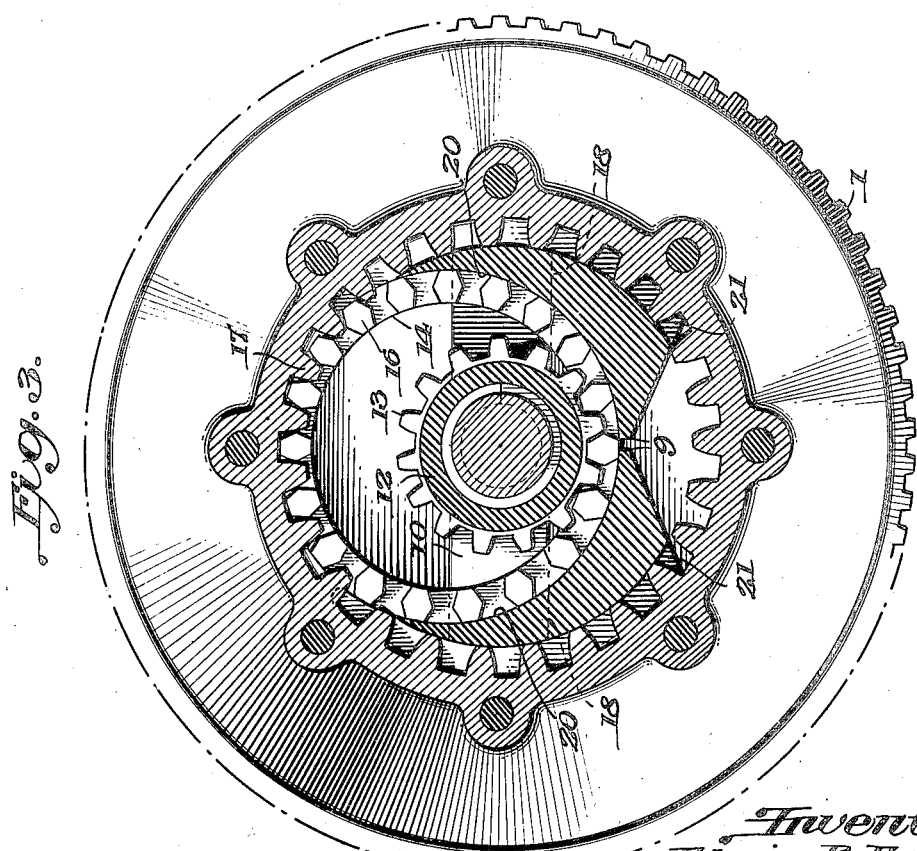

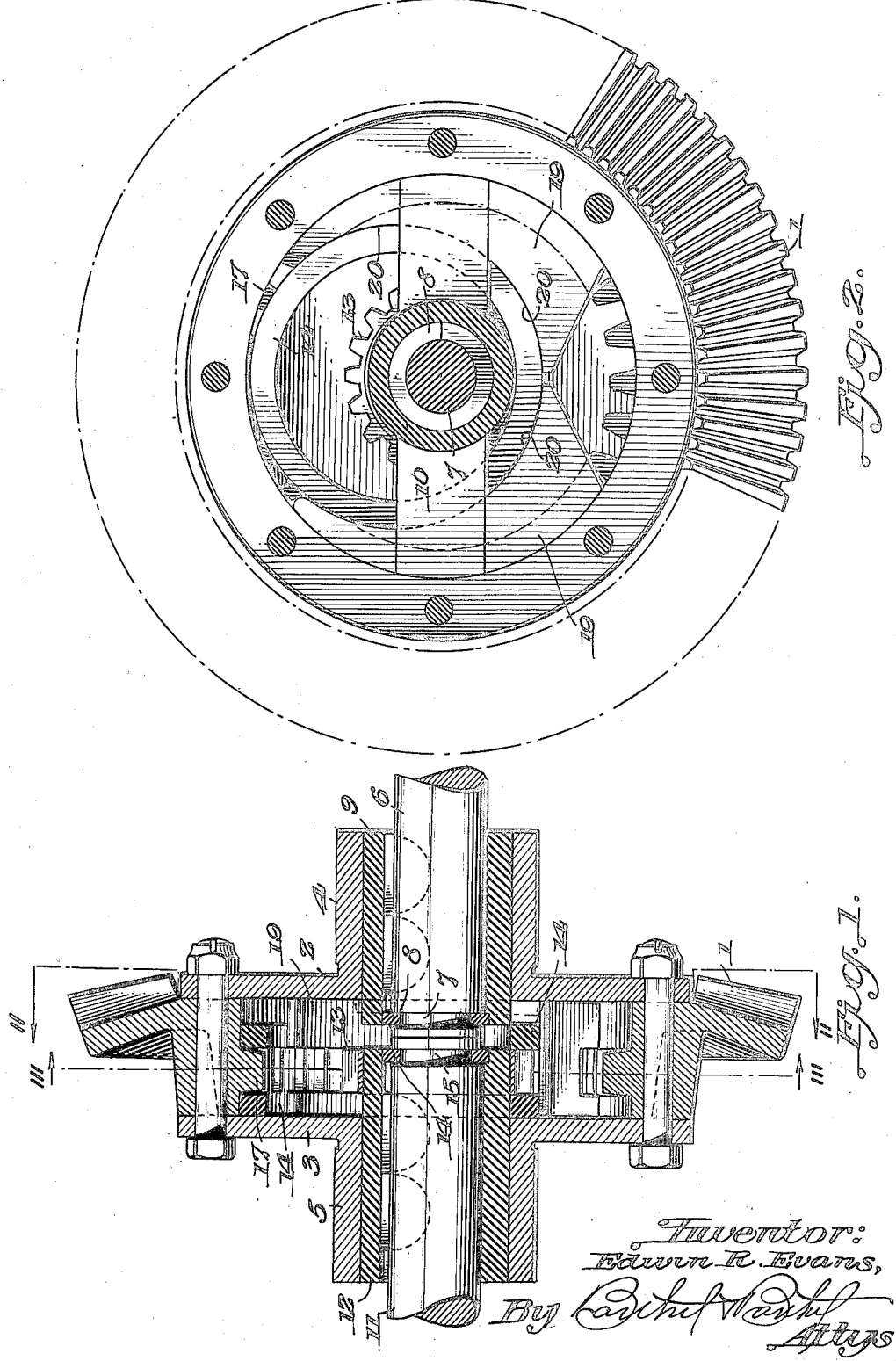

E. R. EVANS.
DIFFERENTIAL MECHANISM.
APPLICATION FILED NOV. 15, 1917.
1,317,281.
Patented Sept. 30, 1919.
6 SHEETS—SHEET 3.
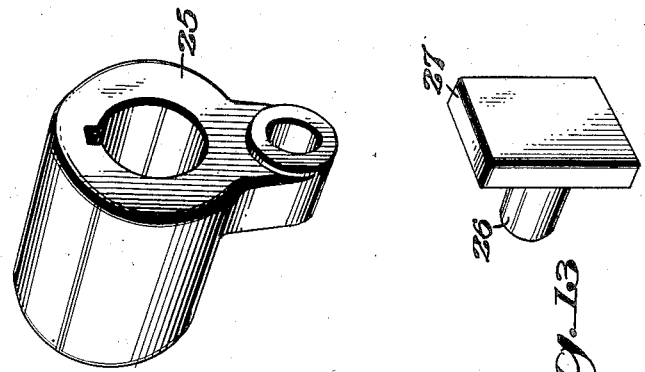
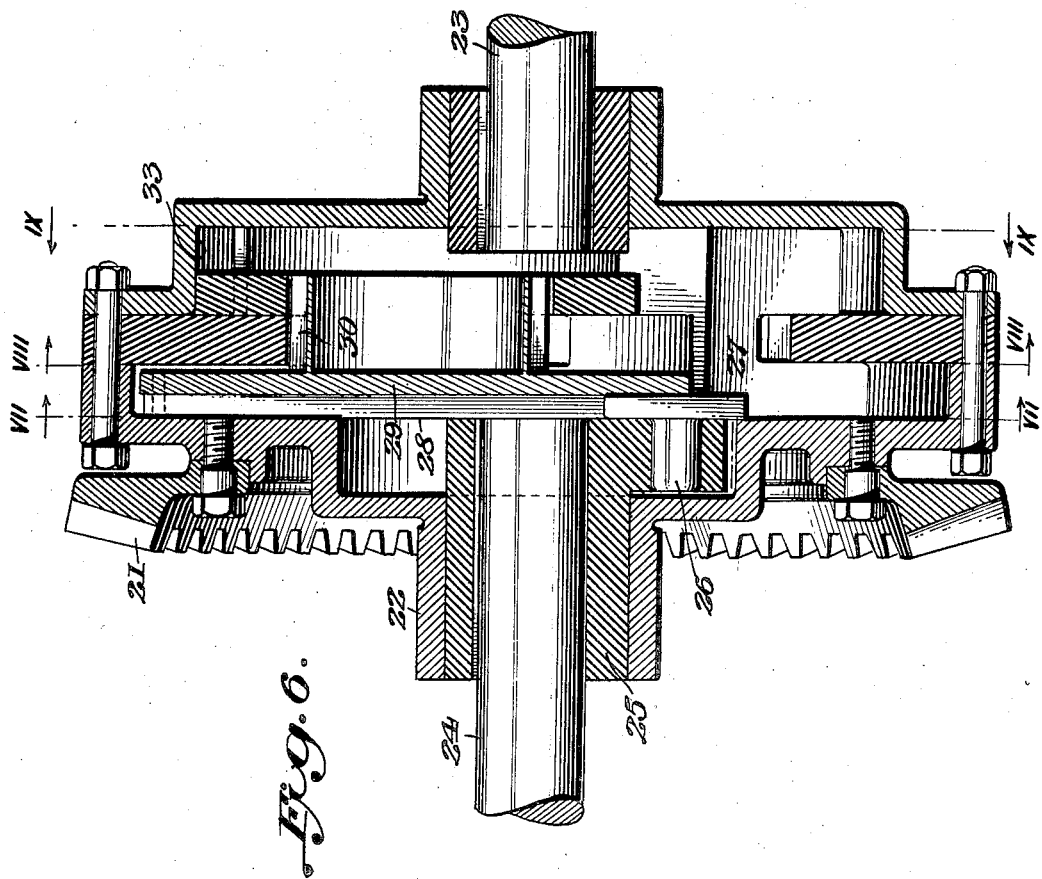
INVENTOR
Edwin R. Evans,
BY
ATTORNEY E. R. EVANS.
DIFFERENTIAL MECHANISM.
APPLICATION FILED NOV. 15, 1917.
1,317,281.
Patented Sept. 30, 1919.
6 SHEETS—SHEET 4.
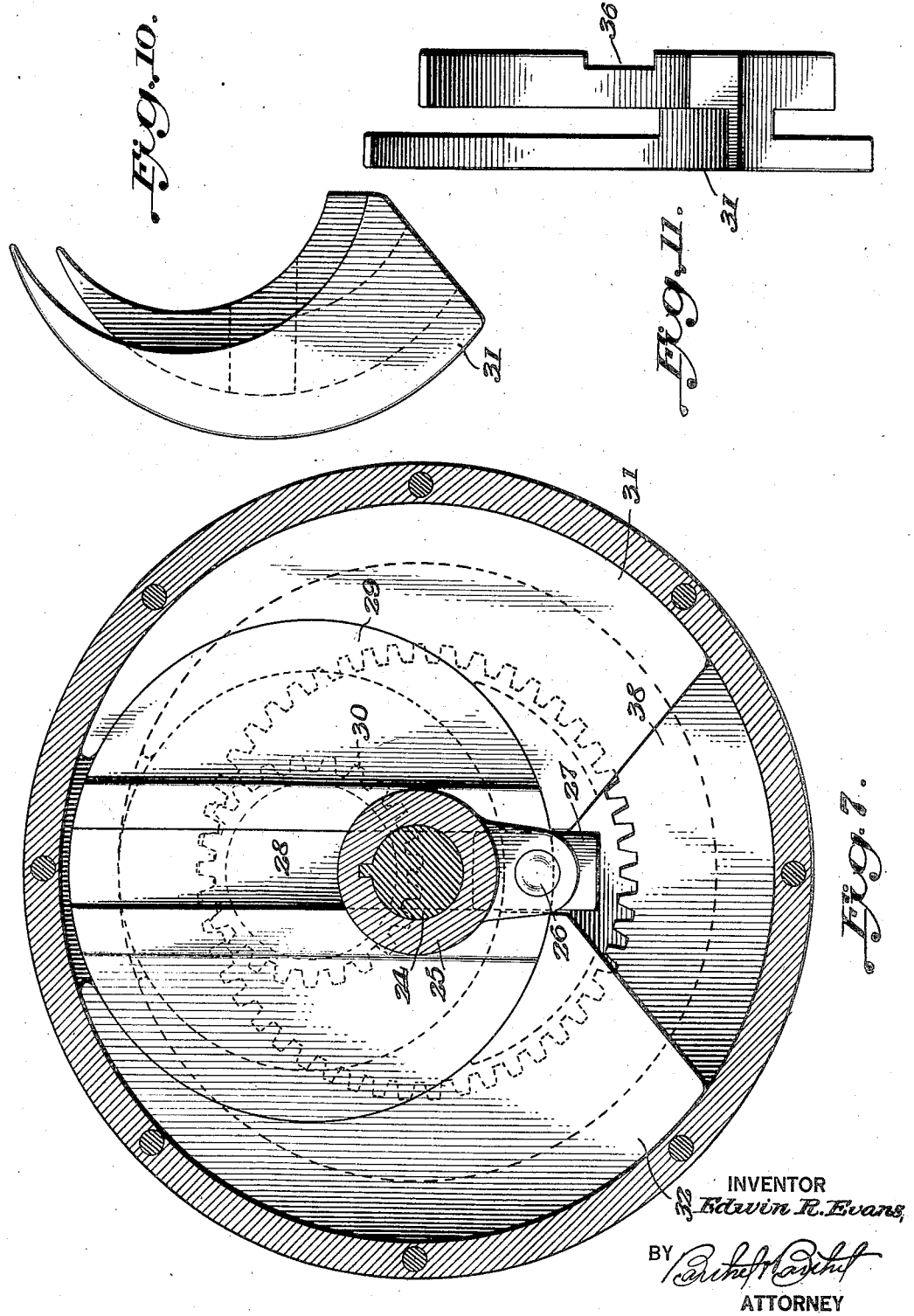
INVENTOR
Edwin R. Evans,
BY
ATTORNEY E. R. EVANS.
DIFFERENTIAL MECHANISM.
APPLICATION FILED NOV. 15, 1917.
1,317,281.
Patented Sept. 30, 1919.
6 SHEETS—SHEET 5.
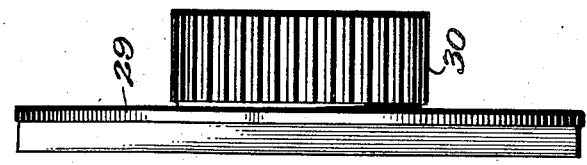
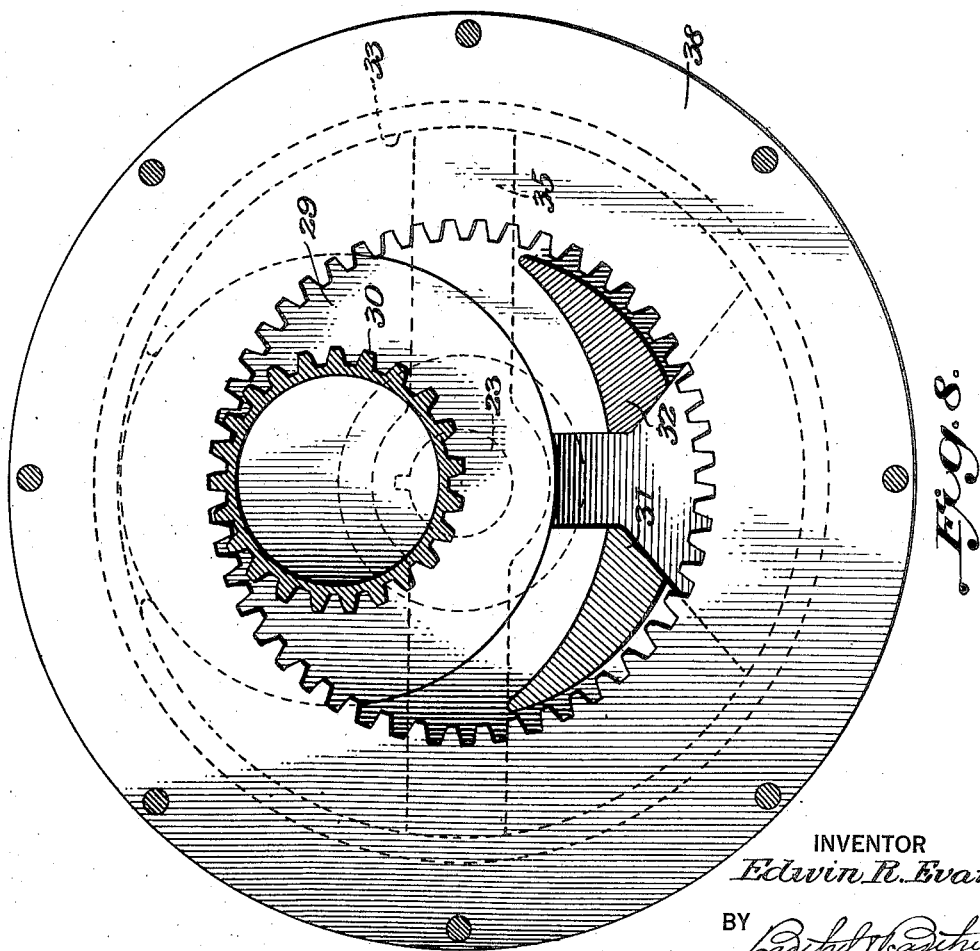
INVENTOR
Edwin R. Evans,
BY
ATTORNEY E. R. EVANS.
DIFFERENTIAL MECHANISM.
APPLICATION FILED NOV. 15, 1917.
1,317,281.
Patented Sept. 30, 1919.
6 SHEETS—SHEET 6.
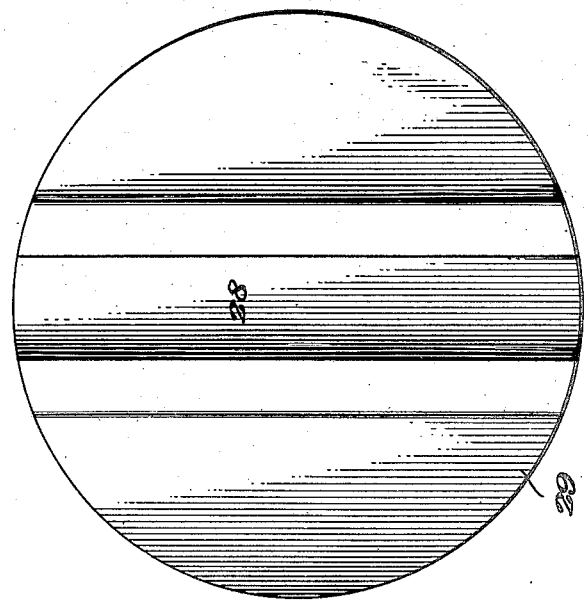
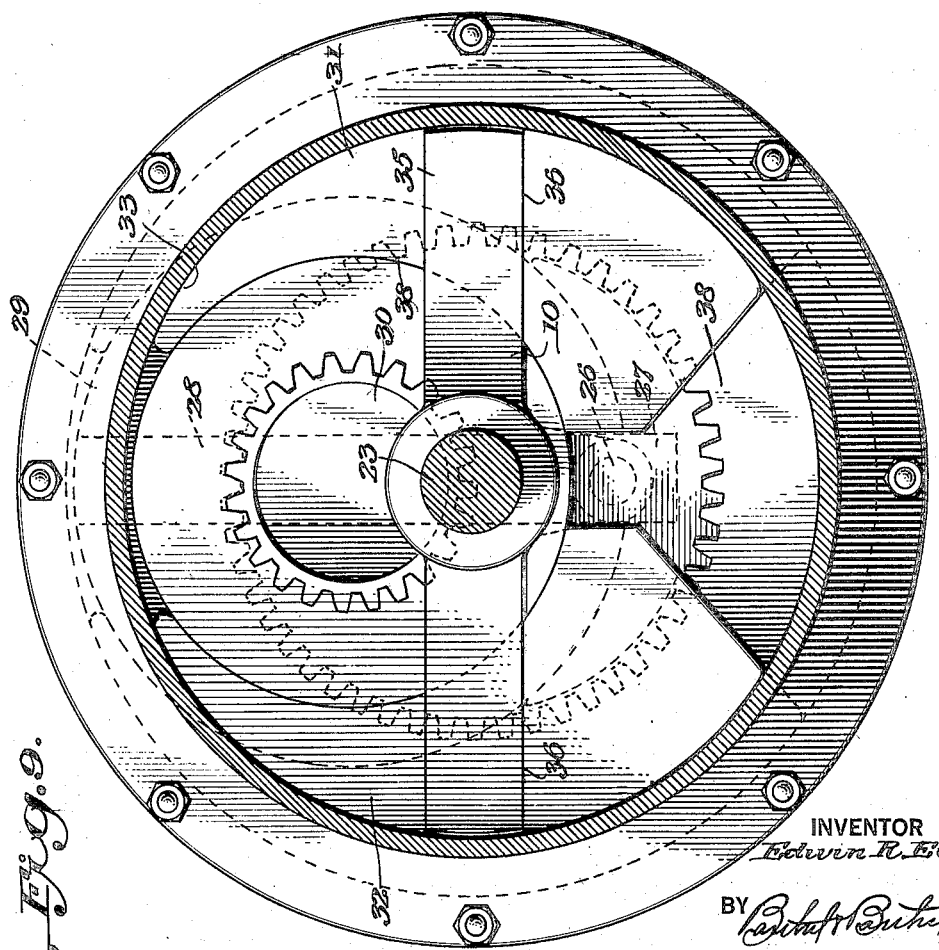
INVENTOR
Edwin R. Evans,
BY
ATTORNEY

UNITED STATES PATENT OFFICE.

EDWIN R. EVANS, OF DETROIT, MICHIGAN.

DIFFERENTIAL MECHANISM.

1,317,281.  Specification of Letters Patent.  Patented Sept. 30, 1919.

Application filed November 15, 1917. Serial No. 202,107.

*To all whom it may concern:*

Be it known that I, EDWIN R. EVANS, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to compensating mechanism and to an arrangement thereof that is particularly effective in the operation of the differential axles of self propelled vehicles the device embodying features whereby a minimum number of parts together with a certainty of action and rigidity of structure are obtained.

The invention consists in the matters hereinafter set forth, and more particularly pointed out in the appended claims.

In the drawings,

Figure 1 is a view in longitudinal section through one form of mechanism that embodies features of the invention;

Fig. 2 is a view, partially broken away and in section on the line II—II of Fig. 1;

Fig. 3 is a view in section taken on or about line III—III of Fig. 1;

Fig. 4 is a view in detail of an eccentric guide block for a wedge;

Fig. 5 is a view in detail of an intermediate gear;

Fig. 6 is a view in longitudinal section through a modification of the device;

Fig. 7 is a view in section taken on or about line VII—VII of Fig. 6;

Fig. 8 is a view in section taken on or about line VIII—VIII of Fig. 6;

Fig. 9 is a view in section taken on or about line IX—IX of Fig. 6;

Figs. 10 and 11 are views in detail of wedge blocks in a modified form;

Figs. 12 and 13 are views in detail of a crank and slide of the modification;

Fig. 14 is a view in detail of an intermediate gear, and

Fig. 15 is a view in detail of a driving plate, at the side of the intermediate gear.

In the preferred form a beveled drive gear 1 and opposed side plates 2 and 3 with hubs 4 and 5 thereon constitute the housing for the mechanism as a whole.

One section 6 of a differential drive shaft is retained by means of a peripheral groove 7 and split washer 8 in the sleeve 9 of a yoke 10. The corresponding differential side section 11 is secured in alined relation to the section 6 by the hub portion 12 of a pinion 13, there being a split ring or washer 14 and retaining groove 15 to prevent endwise movement. The shaft section 6 is keyed to the sleeve 9 and the differential section 11 is correspondingly made fast to the hub 12 of the pinion.

A double geared annulus 14 having double faced teeth 15, with their root portions cut away so that the driving faces only are left, is adapted to mesh with the pinion 13 and also with an internal gear 17 formed on the inner periphery of the main drive gear 1. As a matter of mechanical convenience the annulus 14 is made of two sections whereby the teeth are readily formed and then is assembled as indicated.

The yoke 10 is in effect a parallel-sided driving guide bar that engages into the gains 18 of a pair of oppositely disposed wedge shaped segmental guide blocks 19. The inner faces 20 of these guide blocks have a radius corresponding to the radius of the annulus 14, while the outer periphery has a groove formed therein to bridge over and clear the teeth of the internal gear 17 and bears against the inner periphery of the beveled pinion 1.

Because of this construction, if for example, the mechanism be mounted on a differential drive shaft of a vehicle and the wheels of the latter are turning with equal velocity, and the main gear 1 is driving in the direction of the arrow, then the intermediate annulus 14 is swinging on the center of the shaft 11 which may be for convenience hereinafter termed, the pinion shaft, and thereby drives or rotates the pinion 13 and its shaft. If the intermediate pinion or annulus 14 is prevented from turning ahead or backward about its own axis relatively to the inner annular gear 17 because of the wedge blocks 19 which in turn rotates as if integral with the main casing or gear 1, said annulus 14 thereby drives through said blocks and yoke what may be hereinafter termed the yoke shaft section 6 in unison with the pinion shaft 11.

On turning a corner or under other conditions in which the wheel of the shaft 11 tends to travel ahead of the other wheel, the rotation of the pinion 13 on its own axis in consequence, or rather its tendency to rotate exerts a backward force on the gear annulus 14 and tends to rotate the latter on its own axis. This relieves the pressure against the forward wedge which has been doing the driving and permits the shifting of the yoke in relation to the casing so that the forward wedge advances and the rear wedge follows permitting the rotation backward of the annulus 14 on the internal gear 17.

Or if the wheel of the yoke shaft section 6 tends to advance, that is rotate faster than the casing or main gear 11, then the pressure on the forward wedge block is again relieved, the annulus 14 is permitted to advance in the direction of the main rotation faster than the gear 17 and consequently permits the forward movement of the rear wedge and the consequent increase in speed of rotation of the yoke shaft wheel. Thus the desired differential driving action is obtained permitting the increased speed of either wheel in relation to the other.

Referring now to the modified structure shown in Figs. 6 to 14 inclusive, a main drive gear 21, which forms an integral part of a main housing 22, is concentric around a shaft section 23 and an alined section 24. The latter is keyed to a crank bushing 25 that is provided with a crank pin 26 having a slide block head 27. The latter is reciprocable in a guideway 28 formed in the enlarged body or disk portion 29 of a pinion 30. The latter is held in eccentric relation to the shaft axes by oppositely disposed wedge blocks 31 and 32, the outer faces of which correspond in radius of curvature to the inner periphery 33 of the main casing and the inner faces of which correspond in curvature to the disk portion of the gear 30 and the body thereof. A yoke 35 on the yoke section 23 interlocks with gains 36 in each wedge block whereby the shaft 23 is driven by or drives the wedges as the case may be.

The operation is the same as in the first described construction. When the beveled main gear 21 is rotated and the wheels connected with the shafts 23 and 24 are free to turn at even speed, the entire mechanism is locked to rotate as one. If there is any tendency of the crank shaft 24 to run ahead of the other section, or of the main casing, the reversal of stress on the wedge blocks permits the advance of one and the regression of the other with a consequent backward movement of the pinion 30 on the annular gear 38 of the main casing with which it is in mesh. This permits the relative increase of speed of the shaft 24 in regard to the gear section 1. On the other hand if the yoke shaft 23 tends to move ahead the relief of pressure on the forward driving block and increase of pressure on the rear driving block permits the advance of the pinion 30 on the annular gear 38 in the direction of rotation of the bevel 21. This again permits the increased speed of the section 23.

As a result of this construction a differential or compensating mechanism is obtained that operates freely to produce the desired result, has a minimum number of parts for machining and assembling and is not liable, because of its compact design and arrangement of parts in line of chief stress, to derangement or excessive wear under heavy service. It is especially desirable for use on heavy duty trucks or the like.

Obviously, changes in the details of construction may be made without departing from the spirit of my invention and I do not care to limit myself to any particular form or arrangement of parts.

What I claim is:—

1. A differential mechanism comprising a main rotatable driving member and casing, an internal annular gear secured in the casing, a pair of axially alined sections concentric with the casing, a yoke secured to one shaft section, oppositely disposed segmental wedge blocks interlocking with the yoke to swing concentrically around the shaft axes and each provided with an inner eccentric guide face, an intermediate member constrained by the wedge blocks to move eccentrically to the shaft axis in mesh with the inner annular gear, and means secured to the other shaft section and engaged by the said member to drive the shaft when the member revolves eccentrically, the connections between the wedge blocks and companion shaft sections being such that the tendency of either section to turn faster than the casing advances or regresses the wedge blocks and permits the intermediate member to revolve on its axis and advance or recede on the annular gear.

2. A differential mechanism comprising a main casing, a driving member for rotating the main casing, an inner annular gear secured in the main casing, a pair of axially alined shaft sections journaled in the casing concentrically with the internal gear, a pair of segmental wedge blocks rotatable concentrically in the casing around the shaft, a yoke secured to one shaft section in sliding interlocked relation with the wedge blocks and adapted to turn the companion shaft sections when the wedge blocks revolve, an intermediate pinion journaled between the casing and the wedge blocks eccentrically to the shaft axes, and in mesh with the annular internal gear of the casing, and means secured to the other shaft section and engaged by the pinion to drive the shaft when the pinion revolves eccentrically.

3. A differential mechanism that includes a rotatable driving member, a pair of follower members and an eccentrically revoluble intermediate transmitting member between the main driving member and a follower member to rotate the latter when traveling eccentrically, a wedge member revoluble concentrically with said driving member, adapted to hold the transmitting member to travel in an eccentric path and arranged to drive the other follower member by engagement with both the main driving member and the intermediate member.

4. A differential mechanism wherein a rotatable driving member is connected by means of an eccentrically revoluble intermediate transmitting member to one of a pair of follower members to rotate said follower member, a wedge member for driving the other follower member that holds the intermediate transmitting member to travel in an eccentric path and interlocks with the transmitting member and main driving member to rotate said other follower member.

5. A differential mechanism including a main driving member and a pair of follower members one of which is connected by an eccentrically traveling intermediate member to rotate with the main driving member, a wedge member engaging the driving member and intermediate member and rotating the other follower member to rotate the latter.

6. In a differential mechanism, a rotatable driving member, a pair of follower members, an intermediate transmitting member traveling eccentrically to the main member with which it is operatively connected to rotate one of the follower members, and a wedge member adapted to rotate the other follower member when engaged simultaneously by the main driving members and transmitting member.

7. In a differential mechanism, a main driving member having an inner annular gear, a pair of follower members, an intermediate planetary transmitting pinion connecting one of the follower members with the annular gear, and a wedge member engaged in the angle formed by the planetary member and main driving member to rotate the other follower member.

8. In a differential mechanism, a main driving gear, a pair of follower members concentric therewith, a pair of wedge members revoluble in the driving member around the follower members, an intermediate driving member trained by the wedge member to move integrally to the main driving member and connecting the latter and one of the follower members to rotate said follower member, and connections between the wedge members and the other follower member whereby revolution of the wedge members causes rotation of the follower members.

9. In a differential mechanism, a main driving member, a wedge member having curvilinear sides revolving in the main driving member, a pair of follower members concentric with the driving member and the path of motion of the revoluble wedge, an intermediate member having rolling contact with the main driving member and with one of the follower members and constrained by the wedge member to travel eccentrically to the axis of motion on the latter, and connections between the wedge member and other follower member whereby revolution of the wedge member when engaged by the driving and intermediate members rotates the other follower member.

In testimony whereof I affix my signature in the presence of two witnesses.

EDWIN R. EVANS.

Witnesses:
ANNA M. DORR,
KARL H. BUTLER.